Patented Dec. 28, 1937

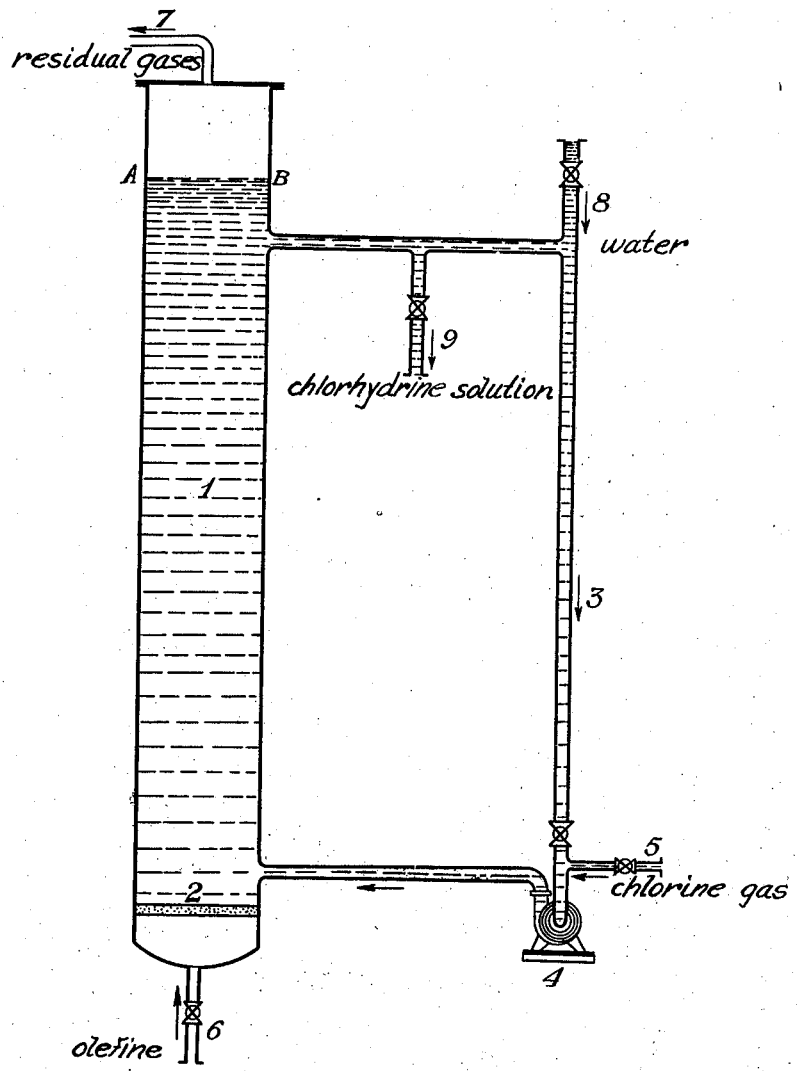

2,103,813

UNITED STATES PATENT OFFICE 2,103,813

PROCESS FOR THE PREPARATION OF CHLORHYDRINS

Paul Ferrero, Tertre, and Corneille Vandendries, Baudour, Belgium, assignors to Societe Carbochimique, Société Anonyme, Brussels, Belgium, a Belgian company Application April 3, 1936, Serial No. 72,640
In France April 15, 1935

3 Claims. (Cl. 260—157)

The present invention relates to a process permitting of preparing in a continuous manner of chlorhydrins directly from water, chlorine and olefines, either diluted or not, and of obtaining a maximum yield in a rational apparatus with a very small expenditure of energy.

It is known that in order to prepare chlorhydrins such as ethylenic chlorhydrin, propylenic chlorhydrin etc., it suffices to add a molecule of hypochlorous acid to a molecule of the corresponding olefine, this reaction taking place in aqueous solution. The requisite hypochlorous acid may be obtained in different ways. It may be freed from hypochlorites by the action of carbonic acid, or chlorine may be introduced into an alkaline solution. In some processes for the continuous production of chlorhydrins comprising the separate introduction of chlorine and olefine hydrocarbon in the solution, it has been proposed to carry out the reaction in the presence of an alkali or of a salt adapted to react with the hydrochloric acid formed, thus avoiding the presence in the solution of any free chlorine. In carrying out these processes use has been made of apparatus in which the step of preparing the hypochlorous acid was effected in a smaller volume than the step of preparing the chlorhydrin, whereby the degree of concentration of the final product was favourably affected. However the presence of alkalis or salts is detrimental to the reaction and one half of the chlorine is lost in the form of alkali metal or alkaline earth metal chloride of no practical value.

It is also known to introduce chlorine and the olefine into the solution without the use of a neutralizing agent, to produce the two successive reactions:

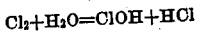

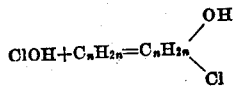

In this case, however the low solubility of the reacting gases, particularly of the olefine, in water and the necessity of operating with dilute chlorine solutions, necessitate the use of very large volumes; it is also necessary to resort to powerful mechanical means, in order to ensure a good dispersion of the gases, so as to limit as much as possible a direct addition of chlorine to the olefine in the gaseous phase, which would lead to the production of undesirable halogenated derivates in undue proportions. The use of special anti-acid materials which have to be resorted to, is a difficulty, not to speak of the large expenditure of energy to be contemplated.

The operative conditions can be improved by introducing the chlorine and the olefine separately, for example by recirculating the solution in a closed circuit, and successively introducing the two gases by separate devices, which process may be made continuous. In this case also, the necessity of avoiding the presence of free chlorine gas and its contact with olefine in the gaseous phase, makes it necessary to operate with very dilute solutions, and under such conditions that all the chlorine be hydrolized before it enters the reaction chamber.

It has also been proposed to recirculate the solution through two towers in series, said towers being constructed as scrubbers with filling material. The liquid flowing down in the first tower meets an ascending stream of chlorine, then charged with chlorine, it crosses the second tower which receives an ascending stream of olefine. This, in fact, amounts to a liquid dispersion in gaseous phase, but this manner of proceeding is disadvantageous, inasmuch as it does not make it possible to avoid in the second tower a partial degassing of the chlorine in this gaseous phase and consequently to avoid undue formation of halogenated derivates, particularly when diluted olefines are operated with.

In order to avoid operating two scrubbers of large size and to avoid the detrimental gaseous phase, while nevertheless preserving the principle of the successive introduction of the two gaseous reagents in a circuit through which the solution flows, it has also been proposed to operate in an ordinary pipe. In such pipe the chlorohydrin solution is actively recirculated under pressure, the chlorine being brought at a predetermined point and the olefine at a further point, under such conditions that the reaction is terminated before the liquid reaches a receptacle from which it is recirculated. In order to obtain with such process an hourly production acceptable on an industrial scale, as the reaction is limited by its own speed which is function of the dispersion of the olefine, one has to recirculate at a very high rate a large volume giving rise to a large expenditure of energy, and be satisfied with a relatively small production of chlorohydrin per cycle.

The object of our present invention is to provide a process for the production of chlorohydrin from chlorine, water and olefines, in a simple manner and with very high yields, without however using any salts or agents adapted to neutralize the hydrochloric acid formed, so that in addition to the above mentioned advantages we obtain the chlorhydrin in a hydrochloric solution from which it can be separated in the manner set forth in our co-pending application Ser. No. 55,926 filed December 23, 1935, whereby the hydrochloric acid is converted into a valuable by-product. This invention is based upon the observation that contrary to what was generally admitted, it is possible to work with concentrated solutions of chlorine, i. e. with chlorine solutions at 15% of saturation or more, without neutralizing agents, provided no discontinuity in the liquid phase is allowed to take place in the circulating system.

Our invention therefore comprises a continuous process of preparing chlorhydrins from chlorine, water and olefine by recirculating the solution and carrying out the step of forming hypochlorous acid and the step of forming the chlorhydrin in volumes of solution respectively adapted to the degree of solubility of the reacting gases, said process being characterized in that the circulation is so controlled that a chlorine solution of at least 15% of saturation is formed in the absence of any neutralizing agent, and said solution is caused to react with the olefine there being no discontinuity in the liquid phase during the circulation. When herein and in the appended claims we refer to a chlorine concentration of at least 15% of saturation, this is to be understood as applied to a solution at ordinary temperature (20° C.).

In carrying out the process, use is made of a tubular side circuit, branched on the reaction chamber, in which side circuit the dissolving of the chlorine is effected so as to avoid any discontinuity in the liquid phase and so as to lead to the formation of a chlorine solution of at least 15% of saturation. The chlorhydrin concentration is kept at the desired value by feeding the circuit with fresh water, in amounts proportioned to the withdrawal of the solution.

Under these conditions we may use olefine either in the pure state or diluted and it is not necessary either to use expensive gas diffusing means, or to resort to over-pressure, or to an excess of olefine. Our improved process ensures a high hourly output, and permits of a remunerative recuperation of the hydrochloric acid formed.

The accompanying diagrammatic drawing illustrates a constructional form of the apparatus.

The reaction is carried out in a tower 1 of material which is resistant to hydrochloric acid and chlorine; the dispersion of olefine is assured, for example, by means of a plate 2 of porous material, but it is understood that any other suitable means might be used to that end. The tower is filled with solution up to the level A—B. The solution is sucked from the top of the tower and forced into the bottom thereof by means of a small recirculation pump 4, inserted in a branch circuit 3 in which the chlorine solution is prepared. The chlorine is introduced at 5 immediately before the pump. The olefine, or the gas containing the same, is introduced at 6 at the bottom of the tower, the inert gases escape at 7 towards the apparatus for subsequently utilizing same. When the required chlorhydrin concentration is reached, the system is fed with a suitable amount of fresh water at 8 and an equivalent amount of solution is withdrawn at 9.

It is also possible to operate with a reverse circulation of the liquid so that same will flow through the tower in contracurrent to the olefine, the branch circuit being suitably modified and any discontinuity in the liquid phase still being avoided; experience shows however that preference is to be given to parallel circulation.

The reaction may be applied to olefine of the ethylene and propylene type or to their mixture, whether or not in presence of inert substances. Two non-limitating examples of applying the invention to ethylene and carrying out the process in this particular case, will now be given:

*Example 1*

The above mentioned apparatus is fed at the rate of 10m³/h. of ethylene at 96% and 9.4m³/h. of chlorine; the rate of the recirculation liquid being regulated so as to produce a chlorine solution at 15% of saturation at 20° C. The introduction of fresh water and the tapping of the solution is carried out so as to maintain the percentage of chlorohydrin at about 5%. The temperature reaches 45° C. The yield in ethylenic chlorohydrin reaches 88% and that of dichlorethane 9% with respect to the ethylene consumed.

*Example 2*

The apparatus is fed at the rate of 10m³/h. of ethylene at 40% and 3,9m³/h. of chlorine, the rate of recirculating the liquid being regulated so as to produce a chlorine solution at 20% of saturation at 20° C. The introduction of fresh water and the tapping of the solution are carried out so as to keep the percentage of chlorhydrin at about 4%. The temperature is kept at 20° C. The yield in ethylenic chlorhydrin reaches 90% and in dichlorethane 8% with respect to the ethylene consumed. Practically no chlorine is found in the residual gases.

We claim:

1. In a continuous process of preparing chlorhydrin from chlorine, water and olefine, causing water to react with chlorine at a comparatively high rate of speed to form a solution of hypochlorous acid and of hydrochloric acid, causing said solution to react with an olefine at a comparatively low rate of speed, circulating the solution in a closed circuit while avoiding any discontinuity in the liquid phase, and controlling the circulation in such manner that a chlorine solution of at least 15% of saturation is formed in the absence of any neutralizing agent, before it is brought into contact with the olefine.

2. In a continuous process of preparing chlorhydrin from chlorine, water and olefine, causing water to react with chlorine in a limited space to form a solution of hypochlorous acid and of hydrochloric acid, causing said acid solution to react with olefine in a larger space, circulating the solution in a closed circuit from said limited space to said larger space and back to said limited space, and controlling the circulation in such manner that a chlorine solution of at least 15% of saturation is formed in the absence of any neutralizing agent, before it is brought into contact with the olefine.

3. In a continuous process of preparing chlorhydrin from chlorine, water and olefine, causing water to react with chlorine in a limited space to form a solution of hypochlorous acid and of hydrochloric acid, causing said acid solution to react with olefine in a larger space, circulating the solution in a closed circuit from said limited space to said larger space and back to said limited space, withdrawing solution from and introducing water into the solution on its way from said larger space to said limited space, and controlling the circulation of the solution and the introduction of water in such manner that a chlorine solution of at least 15% of saturation is formed in the absence of any neutralizing agent before said solution is caused to react with the olefine.

PAUL FERRERO.
CORNEILLE VANDENDRIES.